J. WEATHERS.
Bolt Heading Tool.
No. 32,545. Patented June 11, 1861.
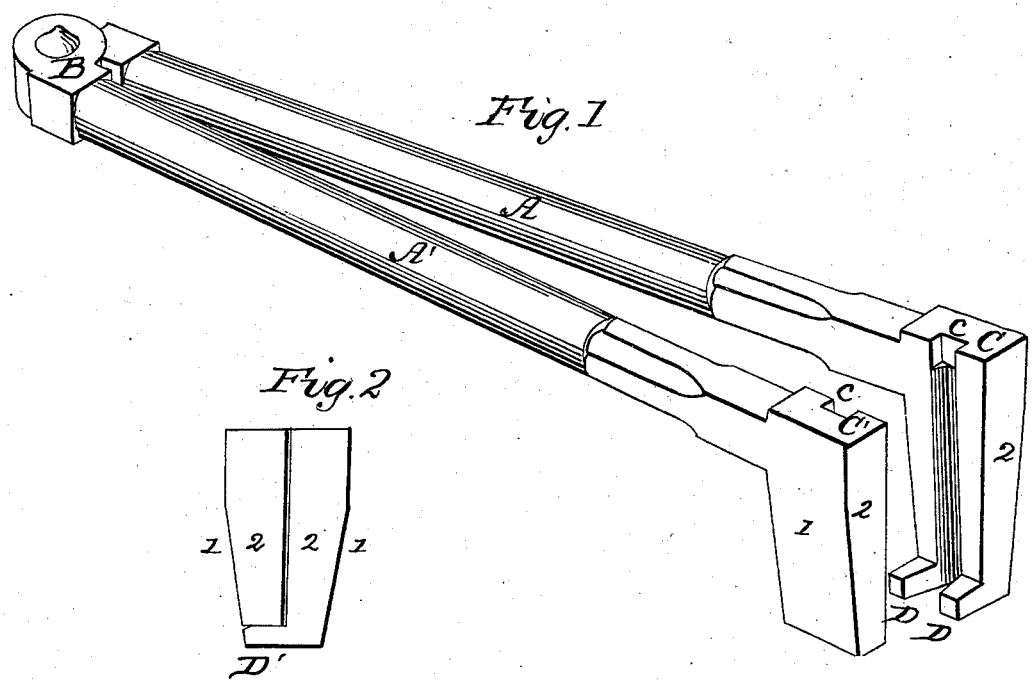
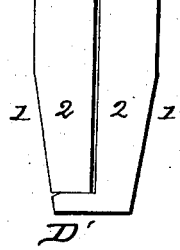
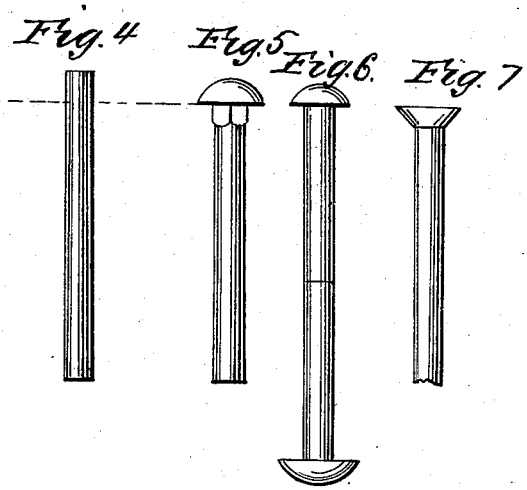

UNITED STATES PATENT OFFICE.

JAMES WEATHERS, OF GREENSBURG, INDIANA.

HEADING BOLTS.

Specification of Letters Patent No. 32,545, dated June 11, 1861.

*To all whom it may concern:*

Be it known that I, JAMES WEATHERS, of Greensburg, Decatur county, Indiana, have invented a new and useful Tool for Heading Bolts, Rivets, &c., of which the following is a full, true, and exact description, reference being had to the annexed drawings, making part of this specification.

The object of this improvement is the more ready heading of bolts, rivets, &c., at the ordinary blacksmith's forge or smithy and the invention consists in a peculiar construction of bolt clamp or tongs hereinafter described.

Figure 1, is a perspective view of a blacksmith's tongs embodying my invention. Fig. 2, is an end view of the closed tongs. Fig. 3 is a transverse section of the gripping die or jaws in place within the anvil or trestle. Fig. 4 represents a blank or rod before heading. Figs. 5, 6 and 7 show different forms of headed bolts or rods.

A A' are two arms hinged together at B and terminating at their free ends in steel jaws C C' whose opposing surfaces are channeled $c$, so as, when the jaws are closed, to form an aperture adapted to securely grip, and, when desired, to shape, the rod to be worked. The closed jaws or die C C' taper downward externally and are so formed as to fit and bind within a square or other hole in an anvil or trestle. The relative dimensions of the die and anvil hole should be such as to tightly confine the backs 1 of the jaws but to leave the sides 2, sufficiently free, to enable the easy withdrawal of the die for insertion of another rod. The grooves $c$, may be roughened so as to secure a tight grip of the stuff and may be so formed as to impart a square countersunk or other neck. (See Figs. 5 6 and 7.)

A flaring crotch D D' after serving to guide the rod to its place acts to bring the tops of the jaws flush as they are closed together.

Operation: The heated rod being laid in the groove of the jaw C, with so much of its length projecting as to form the head, the die is closed together, and, being inserted in the anvil hole, a slight tap with the hammer acts to press the jaws together and to securely clamp the rod. This being done, the projecting portion may be headed down by hammer as usual.

I claim herein as new and of my invention and desire to secure by Letters Patent.

The heading tool A A' B C C' $c$ D D' constructed and operating substantially as set forth.

In testimony of which invention, I hereunto set my hand.

JAMES WEATHERS.

Witnesses:
GEO. H. KNIGHT,
FRANCIS MILLWARD.